April 30, 1963 — R. E. CRUMP — 3,088,019
METHOD AND APPARATUS FOR ELECTRICALLY
BRAZING CELLULAR STRUCTURES
Filed Feb. 17, 1959 — 5 Sheets-Sheet 1
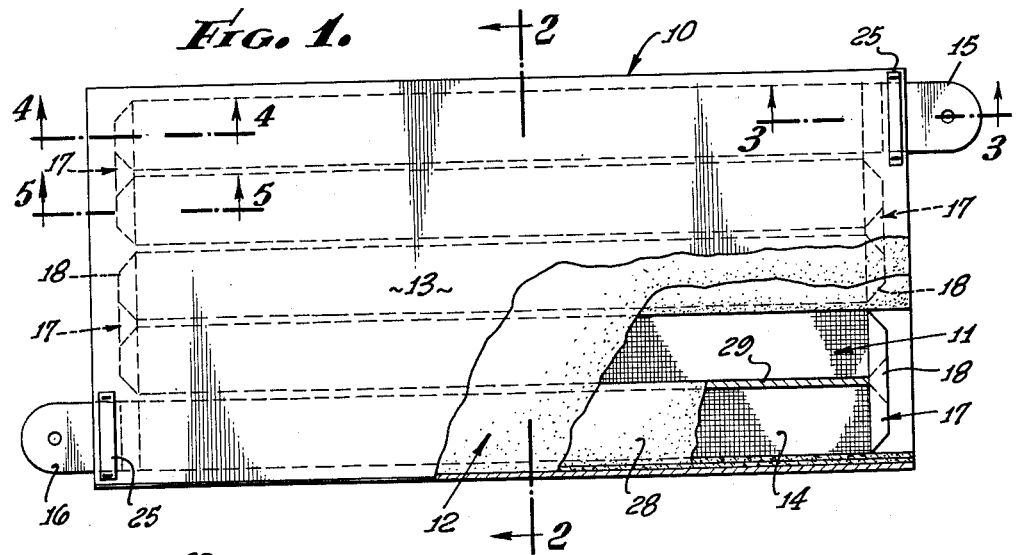
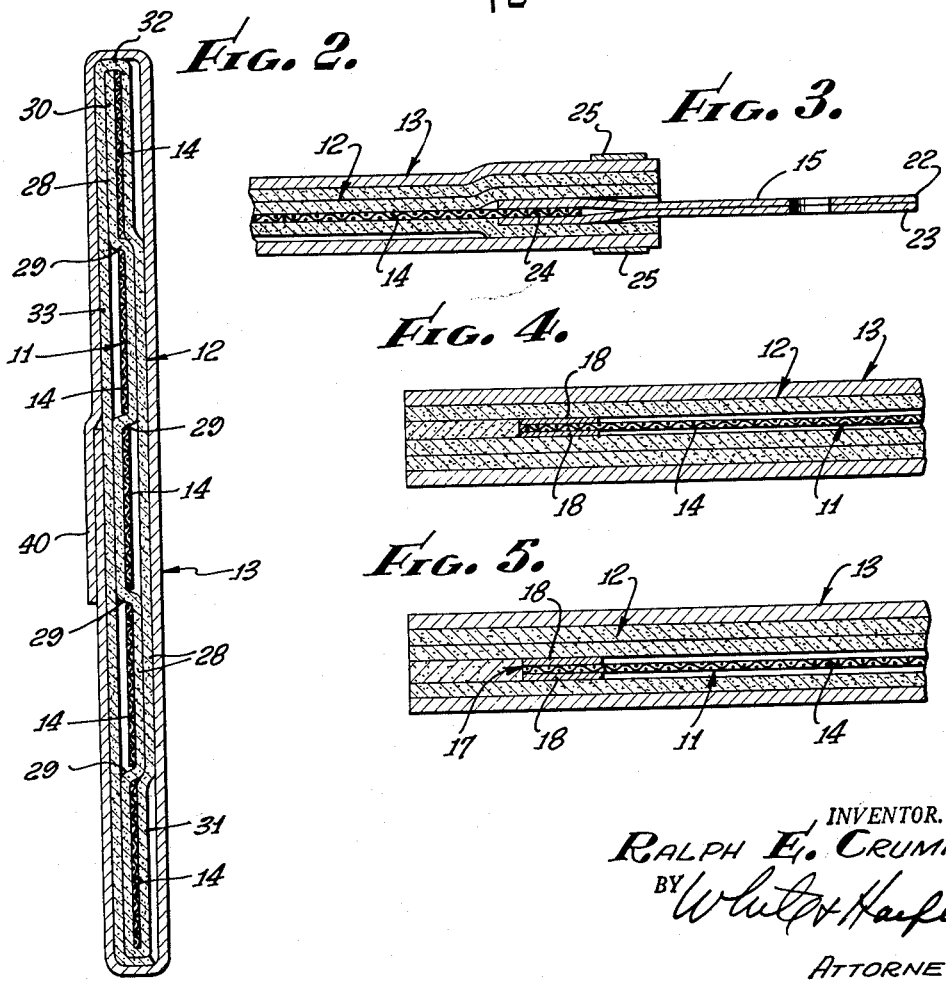
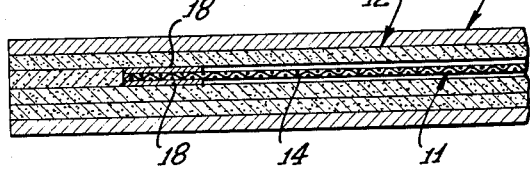
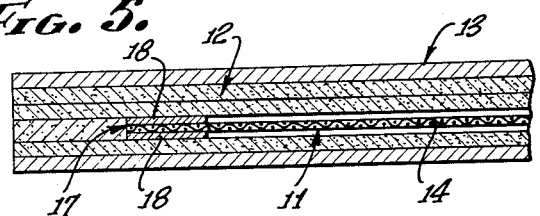
INVENTOR.
RALPH E. CRUMP
BY
ATTORNEYS.

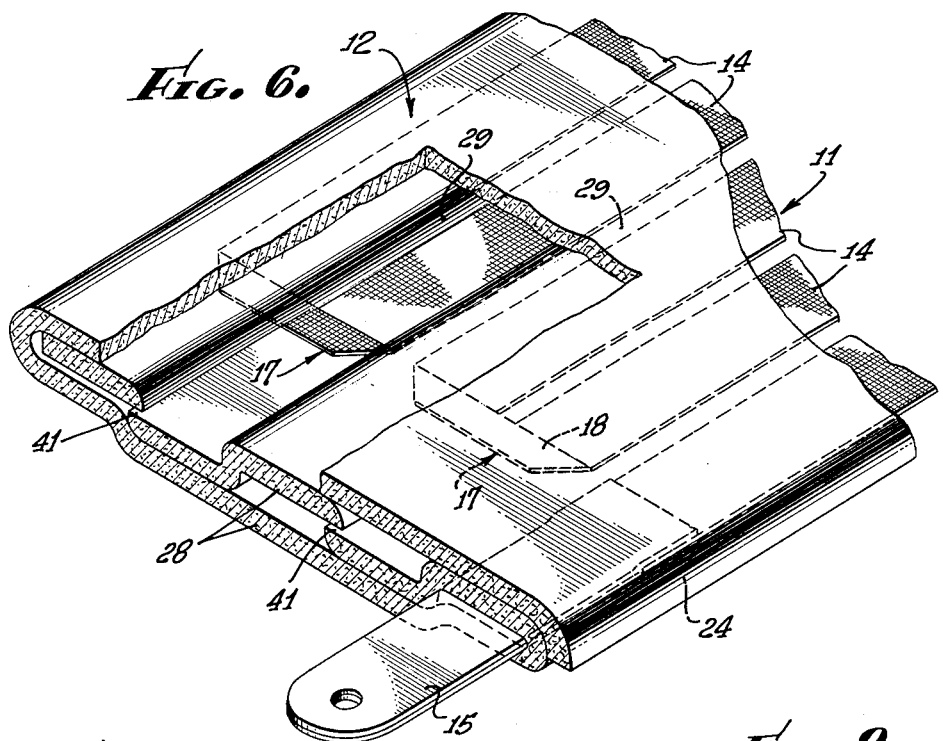
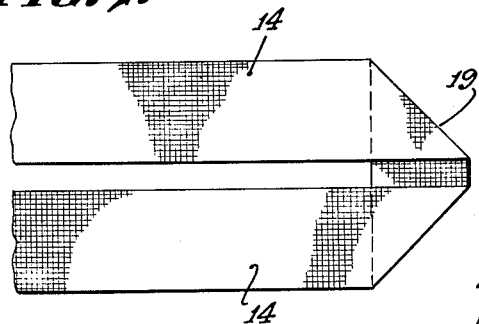
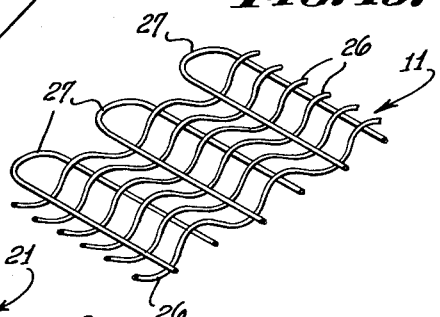
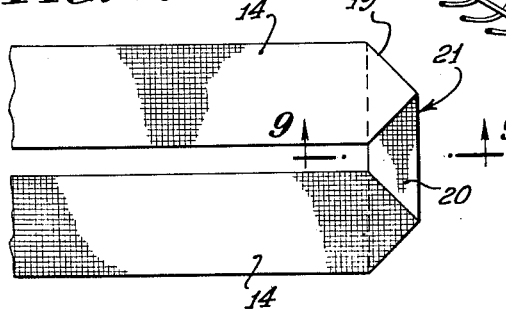
INVENTOR.
RALPH E. CRUMP
BY
ATTORNEYS.

April 30, 1963 R. E. CRUMP 3,088,019
METHOD AND APPARATUS FOR ELECTRICALLY
BRAZING CELLULAR STRUCTURES
Filed Feb. 17, 1959 5 Sheets-Sheet 3
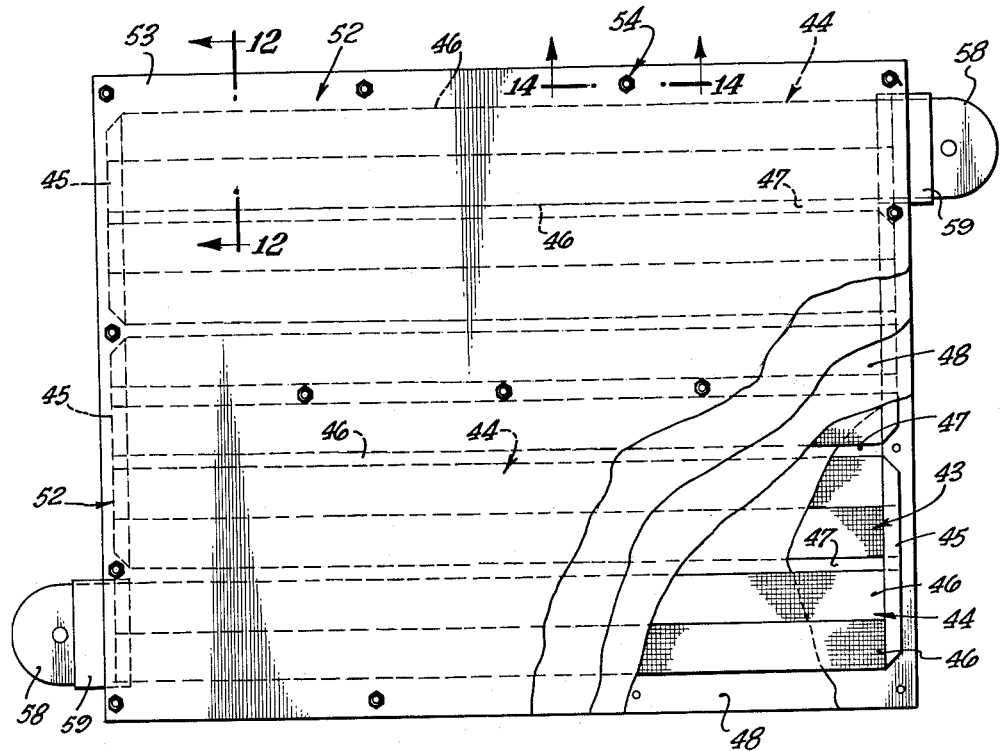
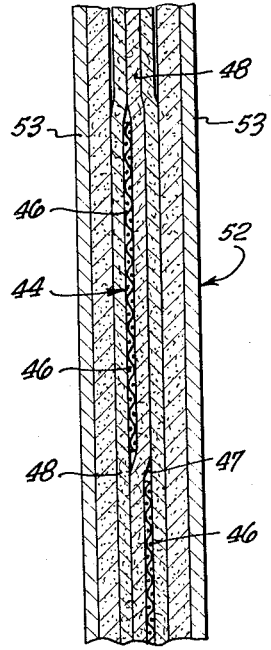 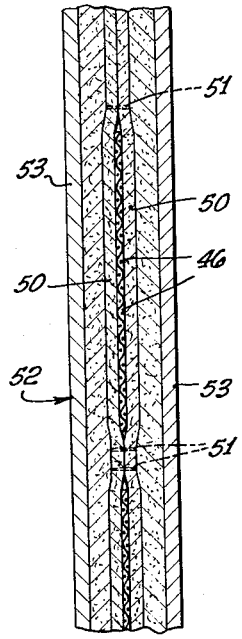 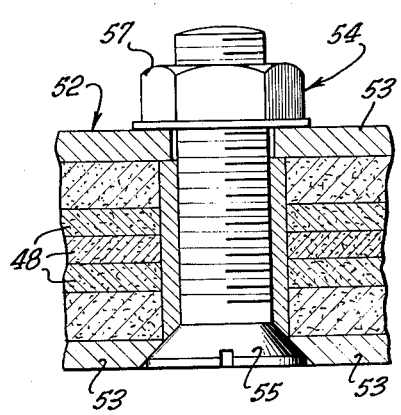
INVENTOR.
RALPH E. CRUMP
BY White & Haefliger
ATTORNEYS.

INVENTOR.
RALPH E. CRUMP
BY
ATTORNEYS.

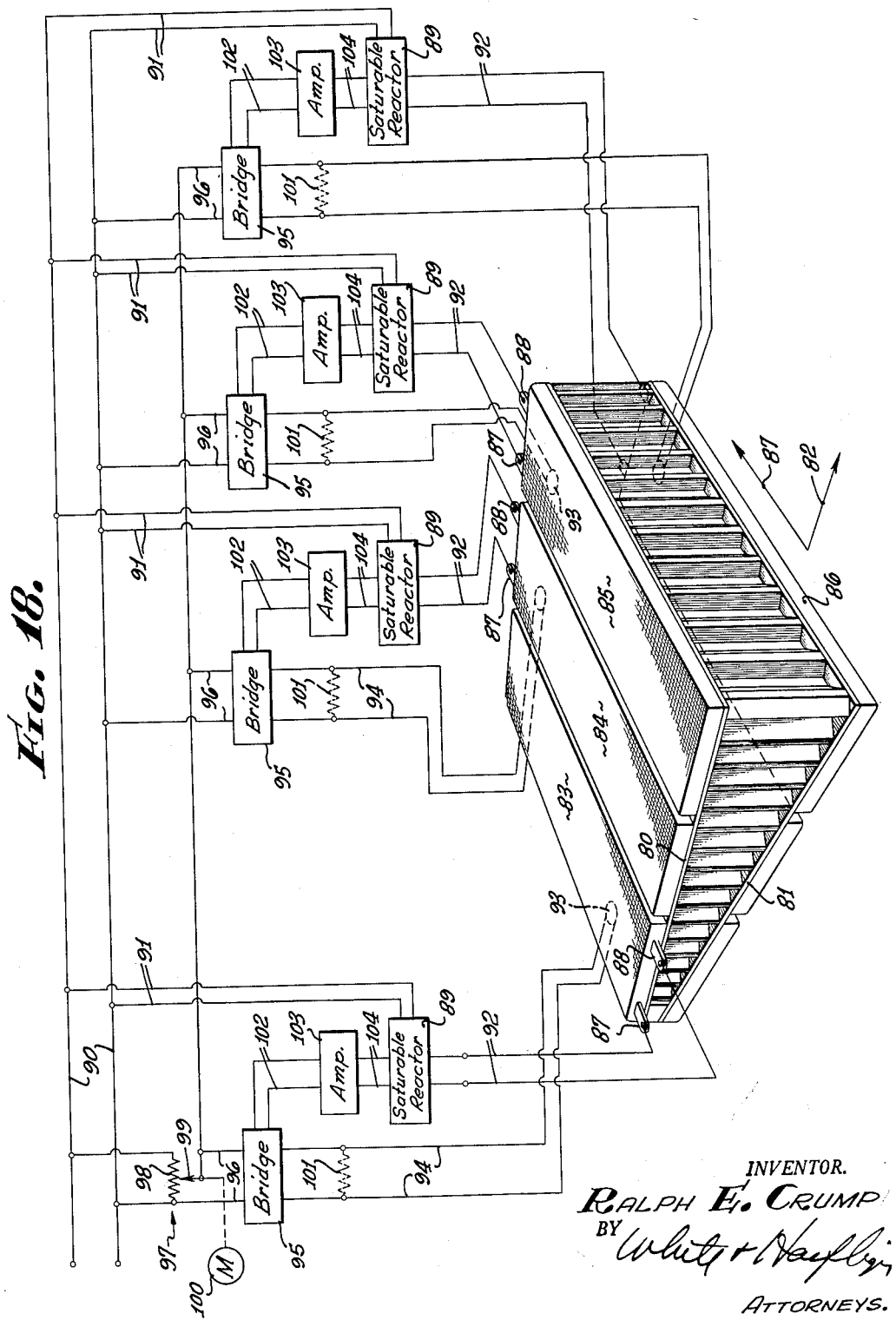

United States Patent Office 3,088,019
Patented Apr. 30, 1963

3,088,019
METHOD AND APPARATUS FOR ELECTRICALLY BRAZING CELLULAR STRUCTURES
Ralph E. Crump, Granada Hills, Calif., assignor, by direct and mesne assignments, of one-half to Electrofilm, Inc., North Hollywood, Calif., a corporation of California, and one-half to Rohr Aircraft Corporation, Chula Vista, Calif., a corporation of California
Filed Feb. 17, 1959, Ser. No. 793,925
29 Claims. (Cl. 219—85)

This invention has to do with improved methods and apparatus for externally heating structures of the character later described, to accomplish their integration by internal brazing or fused joint formation. The invention is directed particularly to the internal brazing by externally applied electrically generated heat, of metal cellular or so-called honeycomb structures of the character later described.

The general problem presented is that of brazing to a prefabricated metallic honeycomb core at temperatures as high as 1600° F. to 1800° F., and above, of surface or skin sheets, typically of stainless steel, by means assuring continuity and completeness of the braze and the avoidance of warpage of the structure as a result of non-uniform heating, all in a manner within desirably practicable limits of economy in heating equipment, operating time and expense, and consistency in effecting a satisfactory braze.

Heretofore it has been the practice to heat the assembled core and surface sheets in large expensive electrical ovens wherein brazing of the work occurs by transference of heat from the furnace walls or heating elements or other gaseous atmosphere of the furnace by convection and radiation over a period of time necessarily long to bring the work up to brazing temperatures of around 1800° F., because of the nature and limitations of the heat transfer mode. In addition to the expense involved by reason of the physical size, structural requirements of the furnace, and the necessity for operating at watt densities as high as 200–400 per square inch, thermally and in terms of power requirements, the brazing operation is highly inefficient and time consuming. Also used have been radiant panel type heating systems involving many complications and limitations.

The present invention has for its major object the provision of new methods and apparatus usable for such high temperature brazing, characterized by their extreme simplicity and low cost as compared with expedients heretofore used, and by the directness and consequent savings of time and power with which the heating may accomplish uniformity in heating and brazing of the work.

The invention contemplates the use of high temperature electrical heaters in the nature of relatively thin, flexible pads applicable closely or directly to the work, and so composed as to be capable of generating and maintaining temperatures upwards of 2000° F. uniformly distributed throughout the heating area of the pad, and capable of high rates of heat transfer to the work, all to the end that the entire areas of the work to be brazed can be brought up to brazing temperature uniformly and at greatly reduced time and power consumption, by reason of the manner in which the heat is generated, distributed, controlled and transferred by conduction directly to the work. In its general aspects, the heating is accomplished by the use of specially formed and distributed heating elements, together with enclosing insulation so composed and arranged as to be capable at the high operating temperatures, of both electrically insulating the element from the work and transferring heat from the element to the work at rates sufficiently high to avoid burn-out of the element. As will appear, by arranging the heat sources in proximate relation to the work, all within an enveloping medium of low thermal conductivity, it is possible to effect the braze at controllable and relatively low watt densities within short periods of time.

Significantly related to the success of the invention is the form and distribution of the heating element within the heating unit or units which must serve the high temperature of heat generation and distribution requirements mentioned in the foregoing. Although the heating unit or pad itself is the subject matter of my copending application entitled "Electrical Heaters," the present method is particularly benefited by the employment of that form of heating unit because of its unique capacity for controllably generating heat uniformly across its entire effective heating area and all in a manner permitting brazing economically in terms of time and required power input. The heating pad is structurally characterized in its utility for the purposes of the present invention by its flexibility and close conformability to the surface to be heated, and the thinness with which the pad may be made to generate high temperature uniformly distributed heat.

The process has particular utility in preventing warpage of the surface sheets as they are brazed to the honeycomb interior structure, especially in those instances where the latter structure has progressively varying thickness. Toward realization of this advantage it is desirable that heat be generated over each of a plurality of extended heating areas close to the work and corresponding to work areas to be brazed. For example, separate flexible heating pads may be applied to the surface sheets at opposite sides of the work, in order that the watt densities in the heating areas occupied by the pads may be separately controlled to keep the temperatures of the work areas to be brazed sufficiently close together, and preferably equalized, as the temperatures are increased, for the prevention of warpage.

In addition, the watt densities in the separate heating areas are controlled to simultaneously increase the temperatures of the work areas in predetermined time rate relation. Thus, should it be desirable to effect a rapid braze without warpage, the watt densities may be controlled not only to rapidly and simultaneously increase the temperatures of the work areas to the extent necessary to achieve the braze, but also to substantially equalize the increasing temperatures of the work areas. Typically, stainless steel sheets about .015 inch thick may be brazed to honeycomb sections ¾ to 2.5 inches thick, and will preferably be subjected to a rise in temperature from ambient to brazing in from 5 to 60 minutes, with a corresponding maximum watt density range of from about 40 to 20.

For achieving desired equalization and uniform increase in temperature in the separately energized heating areas, the process contemplates the application of thermocouples to portions of the sheets underlying the heating areas, and the utilization of the electrical outputs of the thermocouples to control the watt densities in the heating areas. More particularly, a control signal is produced to vary in accordance with the time rate pattern of temperature increase desired, and the thermocouple outputs are compared with that control signal to derive resultant signals operable to control the watt densities in the heating zones.

All the features and objects of the invention, as well as the details of certain illustrative embodiments, will be understood more fully from the following detailed description of the accompanying drawings in which:

FIG. 1 is a plan view showing one form of heating pad embodying the invention, certain of the layers being broken away to reveal the interior parts;

FIG. 2 is an enlarged cross-section on line 2—2 of FIG. 1;

Figure 15:
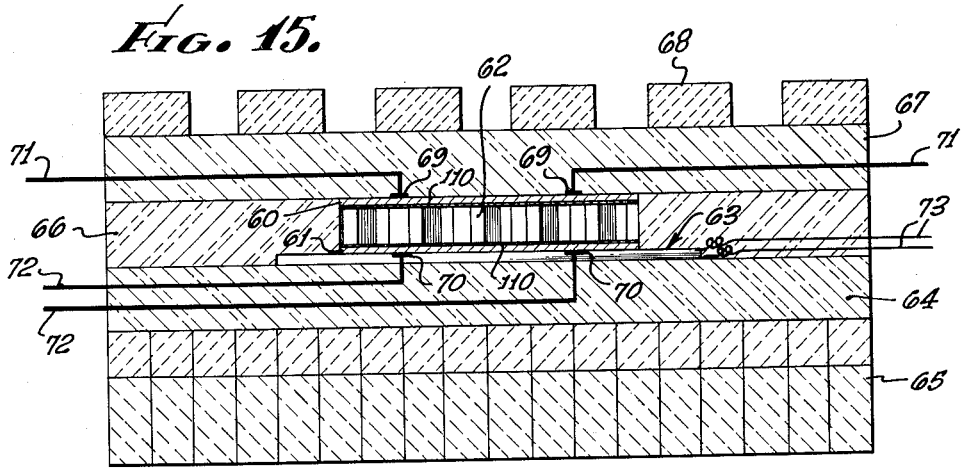
Figure 16:
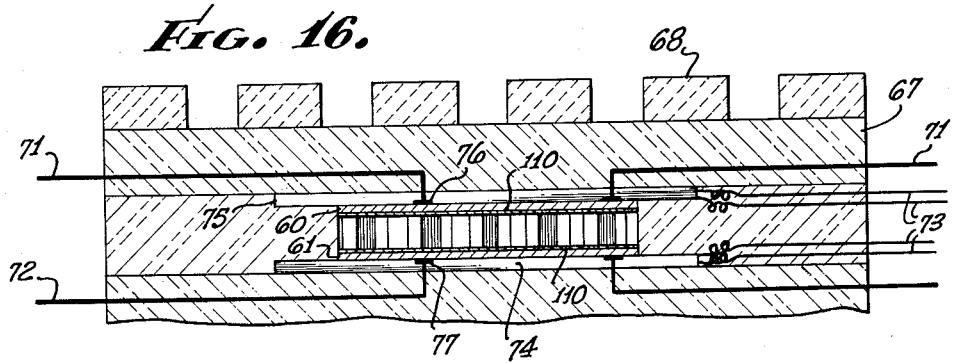
Figure 17:
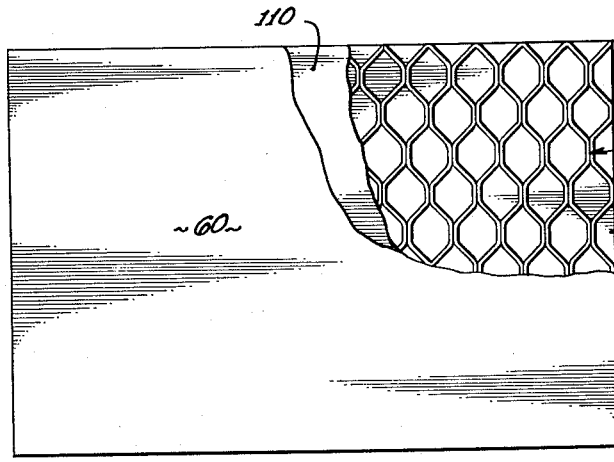

FIGS. 3, 4 and 5 are enlarged fragmentary sections taken respectively on lines 3—3, 4—4 and 5—5 of FIG. 1;

FIG. 6 is a fragmentary perspective showing of the insulated heating element, the outer envelope being removed;

FIGS. 7 and 8 are views illustrating the folded configuration of the element at the ends of adjacent sections;

FIG. 9 is a section taken on line 9—9 of FIG. 8;

FIG. 10 is a view showing the wave configuration of the element warp wires;

FIG. 11 is a view similar to FIG. 1 illustrating a variational form of the invention;

FIG. 12 is a fragmentary enlarged section on line 12—12 of FIG. 11;

FIG. 13 is a view similar to FIG. 12 showing a variational accommodation of the heating element sections within the insulation;

FIG. 14 is an enlarged section on line 14—14 of FIG. 11;

FIG. 15 illustrates the general manner in which the heating pad may be applied and used in conjunction with the work in a brazing operation;

FIG. 16 is a fragmentary view similar to FIG. 15 showing heating pads applied to both sides of the work;

FIG. 17 is a view illustrative of the honeycomb and surface sheet work structure; and FIG. 18 is a perspective view showing the manner in which temperature control is achieved at opposite sides of the work.

Referring first to FIGS. 1 to 5, the heating pad assembly generally indicated at 10 may be characterized as comprising an electrically conductive heating element 11 contained within high dielectric insulating material 12, and an outer cover or envelope 13 which peripherally encloses the element and insulation. As previously indicated, the pad is characterized by its flexibility and consequent close conformability to the surface to be heated, and unusual thinness of the pad considering the high temperatures at which the element 11 may be maintained in electrically insulated relation to the work.

Particularizing first the element 11, the latter is shown to comprise generally parallel lengths or sections 14 of flexible wire mesh woven in strip form, with the sections arranged in close edge-to-edge relation and series connected for current flow between the terminals 15 and 16. The number of sections 14 in any one electrical series may be governed by such considerations as the dimensions of the pad and aggregate section length in relation to resistance and the applied operating voltage. As will be understood without necessity for specific illustration, a plurality of terminaled elements such as I have illustrated in FIG. 1, may be accommodated within a larger area heating pad. The sections 14 may be bussed at their series connected ends 17 by metallic conductors 18 spot welded to each wire of the element, see FIGS. 4 and 5, and offering low electrical resistance, or the sections may be rendered self-bussing by folding over their adjacent series-connected ends in a manner illustrated by FIGS. 7 to 9. Here adjacent sections 14 of the mesh are shown to be folded angularly along the lines 19 and again folded over at 20 to the configuration of FIGS. 8 and 9. If desired, busses like 18 may be applied to the surfaces of the multiple ply fold 21.

Referring to FIG. 3, the terminals 15 and 16 are shown to comprise metal strips 22 and 23 receiving between them at their inner ends within the pad at 24, the ends of the element 11, the terminal strips being brazed or welded together and to the wire mesh. At this point it may be mentioned that the terminals 15 and 16 are held in place by metallic strips 25 applied to and interconnected at opposite sides of the later described cover.

Referring to FIG. 10, the element 11 is woven in strip form of warp wires 26 running longitudinally of the sections 14, and pick or transverse wires 27 in electrical contacting and bussing relation to the warp wires. Thus, by weaving the mesh from a large number of small diameter, high resistance wires, it is possible to achieve large surface heating area and uniform distribution within the area of the strip, and continued conductivity and heating performance of the element is assured despite localized ruptures, for any reason, of the wires within the strip, because of the function of the bussing wires 27 to redistribute the current flow fully across the mesh. I may here refer to disclosures of this type of heating element in co-pending applications Serial Nos. 596,064, now abandoned and 644,070, now Patent No. 2,884,509, issued May 8, 1962, both owned by the Electrofilm, Inc., a joint owner of the present application.

In addition to the features and purposes mentioned, the element 11 has a further important advantage by reason of its capacity to self-compensate for thermal expansion and contraction to the end that the section ends or busses may remain at substantially fixed locations throughout the heating cycle range of the element. Referring to FIG. 10, the element mesh is shown to be woven of warp wires 26 having sinusoidal-like wave form, the wave curvature being sufficient to allow the warp wires to deflect within themselves upon tendency for longitudinal expansion, and thus allow the positions of the thermal busses to remain undisturbed.

Satisfactory results in brazing operations of the character later described, have been achieved using heating elements of wire mesh in strips of about one to one and one-half inch width, woven of "Nichrome" or other high temperature resistant wire in the size range of about 0.0025 to 0.40, the wires or multiple wire strands per inch longitudinally and transversely of the element numbering between about 15 and 70. In a typical instance the mesh has been woven of warp wire 0.0071 inch diameter, 54 wires per lineal inch, and transverse or pick wires 0.0035 inch diameter, 17 per inch. In other instances I have used as the warp wires 36 strands per inch of a plural (3 to 7) wires twisted together to form each strand, each of the twisted wires having 0.0031 inch diameter. Here the pick wires of 0.0031 inch diameter were woven 17 to the lineal inch. The strip of the last-mentioned weave was about one and one-half inch, and the first-mentioned, about one inch.

The element-enclosing insulation 12 is used in a form and composition adequate to maintain the necessary dielectric between the element and conductive work, and any conductive metal in the later described outer covering, while being sufficiently thin to assure heat transfer to the work by conduction with a minimum of insulation, thus preventing burn-out of the element. Here I have shown the element 11 to be inclosed within a sheet 28 of thin, flexible and high dielectric insulating material which preferably is woven or otherwise integrated to assure continuity, and composed of quartz or other siliceous fiber having high electrical dielectric and yet the necessary thermal conductivity. Typically, the insulation sheet 20 may be made of siliceous fiber cloth of the type "Refrasil" (H. I. Thompson Corp., Type C 100–48) or "Fiberfrax" (Carborundum Corp., Type 132) having a thickness of about ⅛ inch. In FIG. 2, the sheet 28 is shown to be woven between the narrow (under one-quarter inch) spacings at 29 between the adjacent edges of the element sections 14, and thus to be applied alternately to opposite surfaces of the sections in extending from 30 to the lowermost element as viewed in FIG. 2, about the lower edge of which the insulation sheet is wrapped to extend upwardly at 31, thus to overlie the remaining exposed surfaces of the sections. Similarly, the insulation sheet wraps around the uppermost element at 32 and extends downwardly at 33 to complete the coverage of all surfaces of the element. The spacing at 30 is sufficiently small as to not significantly disturb the continuity of heating across the entire areas of the element.

The described element covered with the insulation sheet preferably is enclosed within a wear-resistant protective covering or envelope 13, which typically may be a siliceous fiber fabric, about 0.040 inch thick, containing suitable reinforcements such as Nichrome wire insert. For this purpose I have successfully used "Fiberfrax" type 14 T twill weave with Nichrome wire insert. The envelope 13 peripherally encloses the insulated element, and may be suitably held together at the overlap 40.

The perspective showing in FIG. 6 of the insulated element with the envelope removed, illustrates the accommodation of the bussed ends of the element within the insulation, and the placement of the projecting terminals 15. Here the insulation sheet 28 is shown to be split at 41 inwardly a distance sufficient to accommodate the section busses or terminals 17 while allowing the described woven relation of the sections and insulation inwardly of the busses. The brazed connection at 24 between the element end and the terminal 15 is shown to be contained within the insulation.

FIGS. 11 to 14 illustrate a variational form of the invention in which the heating element generally indicated at 43 is shown to be formed of sections 44 thermally connected by busses 45 for series flow of current through the sections, the weave, wire sizes and bussing means being of the character previously described. Here, however, each section 44 comprises a pair of wire mesh strips 46 in edge-to-edge relation so that within each section the strips are interconnected for parallel current flow through them. Adjacent sections 44 may be narrowly spaced at 47 sufficient to pass the insulation sheet 48 woven between the sections as illustrated in FIG. 12. Instead of interweaving the sections and insulation sheet in the manner described and illustrated, each element section 41 may be confined between parallel runs 50 of the insulation, and the insulated spacing between adjacent edges of the sections maintained by stapling or sewing through the insulation at 51.

Here the outer cover or envelope 52 is shown to be made of thin flexible metal sheets 53, such as stainless steel, held together about the periphery of the insulated element by spot welding or other suitable fastening means generally indicated at 54 and which, see FIG. 14, may comprise a bolt 55 extending through an insulation sleeve 56 in the pad. The surface sheets 53 and insulation layers 48 are tightly clamped together by tightening the nut 57. Further in reference to FIG. 11, the element terminals 58 are shown to extend outwardly through sleeve 59 of "Refrasil" or other insulation, clamped within the body of the pad between the surface sheets 53.

FIGS. 15 to 17 illustrate the manner in which the described heating pad may be used to effect an internal braze of top and bottom stainless steel sheets 60 and 61 to a prefabricated stainless steel or other suitable metal core 62. With brazing alloy applied to the interface between the core and sheets, the assembly is placed within an insulated environment such as I have shown in FIG. 15. Here the honeycomb structure rests on the heating pad 63 which I have described and which in turn is supported on an electrical and thermally insulative base 64 supported on fire brick 65. The pad and honeycomb structure are enclosed within insulation 66 at the side and an overlying layer of insulation 67 held in place by fire brick 68. Thermocouples 69 and 70 applied to the top and bottom sheets 60 and 61 may be connected through their leads 71 and 72 to suitable instrumentation for measuring the top and bottom surface temperatures of the sheets, thus enabling the operator to determine and follow the individual as well as the relative surface temperatures in the course of bringing the work up to brazing temperature in the neighborhood of 1800° F., and thereafter during cooling. The current fed to the pad through leads 73 may be governed to control the heating. Typically in the brazing of a honeycomb section about 12 by 24 inches and one inch thick, the heating element may be operated at temperatures as high as 2000° F. and at watt densities around 7 watts per square inch. Given adequate thermal insulation in the material 64, 66 and 67, the honeycomb section of 0.032 inch thick stainless steel, may be brought up to brazing temperature and a uniform bond formed between the sheets and honeycomb core, within a period of about 2 hours. It should be pointed out that watt density to achieve the braze will vary directly with the unit mass of the work to be brazed, inversely with warm up time, and inversely with the thickness of thermal insulation adjacent to the work.

In FIG. 18 there is shown the manner in which temperature control is achieved during heating and brazing of top and bottom stainless steel sheets 80 and 81 to a prefabricated stainless steel or other suitable metal core of honeycomb structure. The latter is shown to have increasing thickness in the direction indicated by the arrow 82, this circumstance in general requiring increasing watt density application in that direction in order to achieve substantial uniformity of temperature at the sheets 80 and 81 during heating and brazing for prevention of warpage.

Several heating pads 83 to 86 of the type previously described are shown applied to the sheets 80 and 81, with the pads extending lengthwise in the direction of arrow 87, that is normal to arrow 82, and characterized in that the unit mass of the honeycomb material does not vary in that dimension. Pads 83 to 85 extend in edge-to-edge relation in the direction of arrow 82, defining a plurality of heating areas adjacent sheet 80. They also extend in opposite relation to corresponding pads applied to sheet 81.

Each of the pads has its own pair of terminals 87 and 88 to which is connected a suitable source 89 of electrical current which can be varied in order to control the watt density in the pad. Preferably the source 89 will comprise a saturable core reactor, although other power sources may be used. As shown, power is supplied to each source 89 from a main line 90 through leads 91, while power is delivered from the reactor to the heating pad through leads 92. The use of a saturable core reactor, of course, allows control or variation in the current delivered, as is known.

Control of current delivery from the reactors 89 is such as to keep the increasing temperatures of the work areas underlying the heating pads sufficiently close together as to prevent warpage of the work, and so far as is possible the watt densities in the heating areas are controlled to substantially equalize the increasing temperatures of the work areas. Furthermore, the watt densities in the heating areas are controlled to simultaneously increase the temperatures of the work areas in predetermined time rate pattern.

To carry out these objectives, thermocouples or other temperature sensitive devices indicated at 93 are suitably attached to the surface sheets at locations underlying the heating pads, in a manner such as is shown in FIG. 18. The voltage outputs of the thermocouples are fed through leads 94 to suitable electrical bridges 95, and are therein compared to a master voltage also fed to the bridges through leads 96. The master voltage, which increases in predetermined time rate pattern corresponding to the desired time rate of temperature increase at the work areas, is typically varied as by means of a potentiometer 97, including resistance 98 and wiper 99. The voltage applied across the resistance 98 may be supplied from the main lines 90 as shown, and the wiper 99 which is connected to one of the leads 96, is driven as by a motor 100 so that the voltage fed to the bridges through leads 96 is increased in the desired time rate pattern. The inherent resistances of the thermocouples are shown in broken lines 101 as connected across the leads 94.

Comparison of the voltage outputs of the thermocouples with the master increasing voltage fed to the bridges from the potentiometer 97 results in the production of resultant signals fed through leads 102 to the amplifiers 103, which preferably comprise magnetic-type amplifiers, the outputs of which are fed through leads 104 to the saturable core reactors 89 in controlling relation with the electrical current delivered from the reactors to the heating pads.

The design of the control system including the potentiometers 97 is such that when the wiper arm 99 has traversed the resistor 98, the position of the arm corresponds to the maximum watt density to be delivered to one of the heating pads known to produce brazing temperatures in the work underlying that heating pad. Also, the wiper arm 99 is driven in traversing relation with the resistor 98 so as to achieve the maximum voltage drop across the leads 96, corresponding to maximum watt density, in a desired time interval. As a result, the watt densities in the different heating pads are controlled not only to simultaneously increase the temperatures of the work areas, but also to keep the increasing temperatures thereof sufficiently close together as to prevent warpage of the work. Furthermore, the watt densities in the different heating areas or pads will vary directly with the product of the equivalent mass and heat capacity of the work underlying the heating areas. Thus, referring to FIG. 18 the watt density input to the heating pad 84 will in general be greater than the watt density at the heating pad 83 due to the tapering configuration of the honeycomb material or work, for the same or substantially the same increasing temperatures of the work areas underlying those heating pads.

The following table summarizes results of heating cycles to achieve brazing temperatures according to the present method, the data referring to the operation of a single heating pad.

Table

|  | Case I | Case II | Case III | Case IV |
|---|---|---|---|---|
| Maximum watt density (watts per square inch) | 40 | 24 | 24 | 7.2 |
| Time to achieve watt density, min | 1 | ½ | 4 | 15 |
| Brazing temperature achieved, °F | 2,000 | 1,800 | 1,800 | 1,600 |
| Time to achieve brazing temperature, min | 3 | 10 | 10 | 200 |

From practical considerations it is desirable to achieve brazing temperatures within 5 to 60 minutes and correspondingly to increase the watt densities in a manner such as to realize this objective.

FIGS. 15 through 17 show brazing material in the form of metal foil sheets 110 interposed between the honeycomb 62 and each of the surface sheets 60 and 61.

I claim:

1. Apparatus usable for internally brazing spaced metallic extended surface sheets of a work piece to its honeycomb metallic core, comprising thermal insulating means for receiving and enveloping the work piece to minimize heat losses therefrom, a flexible heating pad contained within said insulating means in close relation to the work area to be brazed, said pad comprising a unitized laminar assembly including electrically insulative and heat conductive layers and heating means sandwiched therebetween for generating heat electrically therein at temperatures in excess of 1000° F., and uniformly over an extended heating area to correspond to the work area to be brazed, and heat conductive electrical insulation means for transferring heat from said heating means to the work piece uniformly throughout the braze area.

2. Apparatus according to claim 1 including means responsive to temperature conditions at the work surface for controlling energization of said heating means to produce uniformly increasing temperature at the work surface.

3. Apparatus according to claim 1 in which said pad is positioned in proximate relation to one of the surface sheets, and a second similar pad is positioned oppositely and in proximate relation to the other sheet.

4. Apparatus according to claim 3 including means responsive to temperature conditions at the sheet surfaces for controlling energization of said heating means in said pads to produce uniformly increasing temperature throughout said sheet surfaces.

5. Apparatus according to claim 4, in which said last named means include thermocouples for sensing temperatures at the sheet surfaces, means for producing a control signal which varies in accordance with a selected time rate pattern of temperature increase, and means for comparing the thermocouple outputs with said control signal to derive resultant signals operable to control the watt densities in said heating areas.

6. Apparatus according to claim 5 in which said means for controlling energization of the heating means includes a saturable core reactor the voltage output of which is controlled by said resultant signal and is fed to said heating means.

7. A thin freely flexible electrical heating pad engageable with and conformable to a metallic work surface to be heated to elevated temperatures in excess of 1000° F. by transfer of heat by conduction thereto from said pad, comprising, a freely flexible mesh-like heating element formed substantially entirely of high resistance, high heat resistant metallic conductors, said element comprising a plurality of longitudinally and transversely running conductors disposed mutually in bussing contact, said conductors being sufficiently small in cross-section and large in number to provide in the aggregate a large heat dissipating surface area and an evenly distributed surface temperature over said area, and a thin substantially non-resinous and cloth-like cover layer for said element formed of freely flexible high heat resistant and heat conductive dielectric material, said cover layer providing a small thermal gradient between the heating element and the outside surface of the cover layer for rapid transfer of heat therebetween to minimize burn-out of said conductors at said elevated temperatures, said cover layer being directly engageable with and conformable to said work support surface for transfer of the element-generated heat thereto by conduction uniformly from said surface area while also electrically insulating said element from said work surface.

8. A pad according to claim 7, in which said longitudinally running conductors have wave shape rendering them self-compensating for thermal expansion.

9. A pad according to claim 7, in which said element is freely flexible woven wire mesh and said conductors are wires under 0.040 inch diameter.

10. A pad according to claim 7 in which said insulating material extends beyond the periphery of the element.

11. A pad according to claim7, in which said insulating material is of high temperature resistant woven fabric formed of siliceous fiber composition and extends beyond the periphery of the element.

12. A pad according to claim 10 in which said element and insulation material are enclosed in a flexible high temperature resistant envelope.

13. A pad according to claim 12 in which said envelope is a thin flexible metal.

14. A thin freely flexible electrical heating pad usable for conforming with and externally heating work metal structures of the character described for their internal brazing, comprising a freely flexible mesh-like high resistance metallic heating element for generating heat electrically at temperatures in excess of 1000° F. and having elongated generally parallel, terminally interconnected sections each formed substantially entirely of flexible woven wire mesh comprising warp wires running longitudinally of the section and transverse wires in bussing contact therewith, said wires presenting large heating surface areas within the sections and the sections being in close edge-to-edge relation to give substantially uniform heating within the total area of the element, and freely flexible substantially non-resinous and at least partially solid cloth-like dielectric heat resistant and heat conductive insulating material enclosing said element and insulating said sections from each other, said material providing said element with a thin thermally conductive cover layer of small thermal gradient and operable to electrically insulate the element from a work metal structure to be engaged by the pad while transmitting heat thereto uniformly by conduction at temperature in excess of 1000° F., and conductive terminals for said element.

15. A pad according to claim 14, in which said element is formed as a continuous strip of the mesh folded upon itself at the ends of said sections to electrically interconnect therein.

16. A pad according to claim 14, in which the warp wires of said element are of wave shape to render said sections self-compensating for thermal expansion.

17. A pad according to claim 14, in which said insulating material is woven transversely of the element sections and between them.

18. A pad according to claim 14, in which said element and insulating material are enclosed in a flexible heat and wear resistant element closed about all sides of the element, said terminals projecting out of the envelope.

19. A pad according to claim 18, in which said insulating material is composed of woven fabric formed of siliceous fiber and is positioned between the edges of adjacent sections and against opposite surfaces thereof.

20. A pad according to claim 14, in which the warp and transverse wires each number between about 15 and 70 per square inch of the mesh.

21. A pad according to claim 20 in which the woven wires have diameters between about 0.001 and 0.040 inch.

22. A pad according to claim 20, in which the warp wires are twisted in individual strands interwoven with the transverse wires.

23. In the method of internally brazing an extended area surface sheet of a honeycomb work piece to its cellular metallic structure, local surface areas of said sheet requiring application thereto of different watt densities to effect the braze, the steps including applying flexible heating pads against said local surface areas so that each pad corresponds to a selected area, electrically generating heat of controlled watt density within said pads, transferring the heat as it is generated in each pad by conduction through an at least partially solid electrically insulative and heat conductive pad medium to and uniformly throughout the braze area of the sheet to which the pad is applied, and individually controlling the pad watt densities so as simultaneously to raise the local braze area temperatures to over 1000° F. for completion of the braze and to keep the increasing temperatures of said braze areas close together for preventing warpage of the work.

24. In the method of internally brazing spaced metallic extended area surface sheets of a honeycomb work piece to its cellular metallic interior structure, local surface areas of said sheets requiring application thereto of different watt densities to effect the braze, the steps including applying flexible heating pads against said local surface areas so that each pad corresponds to a selected area, electrically generating heat of controlled watt density within said pads, transferring the heat as it is generated in each pad by conduction through an at least partially solid electrically insulative and heat conductive pad medium to and uniformly throughout the braze area of the sheet to which the pad is applied, and individually controlling the pad watt densities so as simultaneously to raise the local braze area temperatures to over 1000° F. for completion of the braze and to keep the increasing temperatures of said braze areas close together for preventing warpage of the work.

25. The method of claim 24 in which the watt density generation in the pads is controlled to keep the braze area temperatures substantially equalized during temperature increase.

26. The method of claim 25 in which said control step includes applying thermocouples to said sheet surface areas under said pads, and utilizing the thermocouple outputs to control the watt densities generated in said pads.

27. The method of claim 26 in which said control step includes producing a control signal which varies in accordance with the time rate pattern of temperature increase, comparing said thermocouple outputs with said control signal to derive resultant signals, amplifying said resultant signals, using the amplified signals to control the voltage outputs of saturable core reactors, and applying the reactor voltage outputs to resistive type heating elements confined within said pads.

28. Apparatus usable for internally brazing spaced metallic extended surface sheeting of a work piece to its honeycomb metallic core, comprising flexible heating pads positioned in proximate relation to said surface sheeting, each pad comprising a unitized laminar assembly including electrically insulative and heat conductive layers and heating means sandwiched therebetween for generating heat electrically therein at temperatures in excess of 1000° F., and uniformly over an extended heating area to correspond to the work area to be brazed, and heat conductive electrical insulation means for transferring heat from said heating means to the work piece uniformly throughout the braze area, and means responsive to temperature conditions at the sheeting surface for controlling energization of said heating means in said pads to produce substantially uniformly increasing temperature throughout said sheeting surface.

29. Apparatus according to claim 28, in which said last named means include thermocouples for sensing temperatures at different sheeting surface locations, means for producing a control signal which varies in accordance with a selected time rate pattern of temperature increase, and means for comparing the thermocouple outputs with said control signal to derive resultant signals operable to control the watt densities in said heating areas.

References Cited in the file of this patent

UNITED STATES PATENTS

| | | |
|---|---|---|
| 853,351 | Fulton | May 14, 1907 |
| 916,140 | Fulton | Mar. 23, 1909 |
| 1,533,269 | Reid | Apr. 14, 1925 |
| 1,979,786 | Andrus | Nov. 6, 1934 |
| 2,155,029 | Westin | Apr. 18, 1939 |
| 2,363,719 | Cooper et al. | Nov. 28, 1944 |
| 2,693,636 | Simpelaar | Nov. 9, 1954 |
| 2,884,509 | Heath | Apr. 28, 1959 |
| 2,984,732 | Herbert | May 16, 1961 |
| 2,985,860 | Morey | May 23, 1961 |

FOREIGN PATENTS

| | | |
|---|---|---|
| 1,021,520 | Germany | Dec. 27, 1957 |